United States Patent
Nakagawa et al.

(10) Patent No.: US 9,447,294 B2
(45) Date of Patent: Sep. 20, 2016

(54) ACTIVE ENERGY RAY CURABLE COMPOSITION, AND CURED PRODUCT AND USE THEREOF

(71) Applicant: NATOCO CO., LTD., Miyoshi-shi (JP)

(72) Inventors: Akira Nakagawa, Miyoshi (JP); Eisuke Ninomiya, Miyoshi (JP)

(73) Assignee: NATOCO CO., LTD., Miyoshi-Shi (JP)

( * ) Notice: Subject to any disclaimer, the term of this patent is extended or adjusted under 35 U.S.C. 154(b) by 0 days.

(21) Appl. No.: 14/380,777

(22) PCT Filed: Apr. 26, 2013

(86) PCT No.: PCT/JP2013/062486
§ 371 (c)(1),
(2) Date: Aug. 25, 2014

(87) PCT Pub. No.: WO2013/190913
PCT Pub. Date: Dec. 27, 2013

(65) Prior Publication Data
US 2015/0030820 A1    Jan. 29, 2015

(30) Foreign Application Priority Data
Jun. 19, 2012    (JP) ................... 2012-137978

(51) Int. Cl.
| | |
|---|---|
| C08F 2/46 | (2006.01) |
| C08G 61/04 | (2006.01) |
| C09D 11/101 | (2014.01) |
| C08G 65/18 | (2006.01) |
| C09D 11/322 | (2014.01) |
| C09D 11/38 | (2014.01) |

(52) U.S. Cl.
CPC ............ *C09D 11/101* (2013.01); *C08G 65/18* (2013.01); *C09D 11/322* (2013.01); *C09D 11/38* (2013.01); *Y10T 428/24802* (2015.01)

(58) Field of Classification Search
CPC .... C09D 11/101; C09D 11/322; C09D 11/38
USPC .................................................. 522/1; 520/1
See application file for complete search history.

(56) References Cited

U.S. PATENT DOCUMENTS

| | | |
|---|---|---|
| 6,586,496 B1 | 7/2003 | Takamatsu et al. |
| 2005/0147918 A1* | 7/2005 | Weber et al. .............. 430/270.1 |

FOREIGN PATENT DOCUMENTS

| | | | |
|---|---|---|---|
| JP | 2001-139933 A | | 5/2001 |
| JP | 2001220526 A | | 8/2001 |
| JP | 2003-128779 A | | 5/2003 |
| JP | 2003-138005 | * | 5/2003 |
| JP | 2003-138005 A | | 5/2003 |
| JP | 2003-171459 A | | 6/2003 |
| JP | 2004161887 A | | 6/2004 |
| JP | 2005-089697 A | | 4/2005 |
| JP | 2005-336349 A | | 12/2005 |
| JP | 2006-257206 | * | 9/2006 |
| JP | 2010-260281 | * | 11/2010 |
| JP | 2011-153255 A | | 8/2011 |

OTHER PUBLICATIONS

Aoso, JP 2006-257206 Machine Translation Part 1, Sep. 28, 2006.*
Aoso, JP 2006-257206 Machine Translation Part 2, Sep. 28, 2006.*
Kamimura et al, JP 2003-138005 Machine Translation, May 14, 2003.*
Takabayashi, JP 2010-260281 Machine Translation, Nov. 18, 2010.*
International Preliminary Report on Patentability (IPRP) for PCT/JP2013/062486, dated Dec. 23, 2014, 4 pages.

* cited by examiner

*Primary Examiner* — Ling Choi
*Assistant Examiner* — Jessica E Whiteley
(74) *Attorney, Agent, or Firm* — Marsh Fischmann & Breyfogle LLP

(57) ABSTRACT

Provided is an active energy ray-curable composition that is capable of improving adhesiveness of a cured product and of suppressing detachment or peeling of the cured product as well as a cured product and use thereof. The active energy ray-curable composition contains, as active ingredients, an oxetane alcohol represented by the following structural formula (1) or (2), a silane coupling agent, and a photoacid-generating agent. A silicon component in the silane coupling agent is contained in an amount of preferably 1 to 21% by mass, in terms of silica ($SiO_2$), in the active energy ray-curable composition. In the formula, p is an integer of 1 to 10.

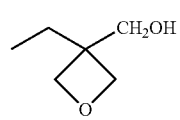

(1)

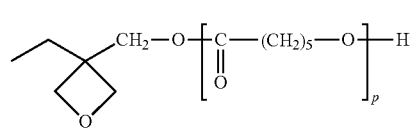

(2)

11 Claims, No Drawings

ACTIVE ENERGY RAY CURABLE COMPOSITION, AND CURED PRODUCT AND USE THEREOF

FIELD OF THE INVENTION

The present invention relates to an active energy ray-curable composition to be used as a printing ink, such as an inkjet ink, and an ultraviolet curable paint and being capable of providing a cured product having excellent adhesiveness.

BACKGROUND OF THE INVENTION

A curable composition that is cured by irradiation with an active energy ray, such as an ultraviolet ray, is excellent in environmental performance since it does not require an organic solvent and is excellent in productivity since it has a high curing rate. Many of such active energy ray-curable compositions are of a radically polymerizable type using, for example, (meth)acrylate. However, the radically polymerizable type has drawbacks of being subject to polymerization inhibition by oxygen and to a large shrinkage in volume after the polymerization. In contrast, a cationically polymerizable type using, for example, an oxetane compound, a vinyl ether compound, or an epoxy compound is less subject to the drawbacks observed with the radically polymerizable type.

A photocationically curable composition, which is a curable composition of such a cationically polymerizable type, is disclosed in Patent Document 1. The photocationically curable composition contains an epoxy group-containing silane coupling agent and a photocationic polymerization initiator. A cationically reactive compound other than the epoxy group-containing silane coupling agent is further incorporated into the photocationically curable composition. An epoxy compound or an oxetane compound is used as the cationically reactive compound.

PRIOR ART DOCUMENT

Patent Document 1: Japanese Laid-Open Patent Publication No. 2011-153255

SUMMARY OF THE INVENTION

In the photocationically curable composition described in Patent Document 1, xylylenebisoxetane and di[1-ethyl(3-oxetanyl)]methylether are used as oxetane compounds, which are cationically reactive compounds. However, in the case where the photocationically curable composition, which contains these oxetane compounds, is cured by coating the composition on an object such as a glass and then irradiating the composition with an ultraviolet ray, the adhesiveness of the cured product to the glass is unsatisfactory, and the adhesiveness after hot water immersion is poor.

As to such drawbacks, the reason why the adhesiveness of the cured product to the glass is unsatisfactory is considered that the oxetane compounds do not have any functional group that sufficiently enhances the adhesiveness. Further, a polymer obtained from the cationic polymerization has a large free volume (clearance between polymer chains). Therefore, when the cationic polymer is immersed into water, water easily enters the polymer. As a result, the adhesiveness of the cationic polymer to the object is deteriorated.

The present invention was accomplished in view of the above-described problems of the conventional art, and it is an objective of the present invention to provide an active energy ray-curable composition that is capable of improving adhesiveness of a cured product and of suppressing detachment or peeling of the cured product as well as a cured product and use thereof.

In order to achieve the foregoing objective, an active energy ray-curable composition defined in claim 1 is characterized by containing, as active ingredients, an oxetane alcohol represented by the following structural formula (1) or (2), a silane coupling agent, and a photoacid-generating agent:

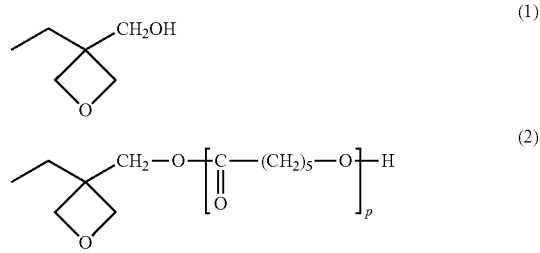

wherein p is an integer of 1 to 10.

An active energy ray-curable composition defined in claim 2 is characterized in that in the invention according to claim 1, the silane coupling agent is a compound represented by the following general formula (3):

$$(RO)_{4-n}\text{—Si—}X_n \tag{3}$$

wherein R is a methyl group or an ethyl group, n is 0, 1, or 2, and X is an organic group having a hydrogen atom, a methyl group, an ethyl group, a vinyl group, an allyl group, a (meth)acryloyl group, a glycidyl group, a 3,4-epoxycyclohexyl group, or a (3-ethyloxetanyl)methyl group.

An active energy ray-curable composition defined in claim 3 is characterized in that in the invention according to claim 2, X in the general formula (3) is an organic group represented by the following general formulas (4), (5), (6), or (7):

$$\text{—Y—Z—V} \tag{4}$$

$$\text{—Z—V} \tag{5}$$

$$\text{—Y—V} \tag{6}$$

$$\text{—V} \tag{7}$$

wherein Y is an alkylene group having a carbon number of 1 to 3, Z is an oxygen atom or a divalent organic group having organopolysiloxane represented by general formula (8), and V is a hydrogen atom, a methyl group, an ethyl group, a vinyl group, an allyl group, a (meth)acryloyl group, a glycidyl group, a 3,4-epoxycyclohexyl group, or a (3-ethyloxetanyl)methyl group:

$$\text{—O—[Si(Q)}_2\text{-O—]}_m\text{—} \tag{8}$$

wherein each Q is independently an alkoxy group having a carbon number of 1 to 4 or an alkyl group having a carbon number of 1 to 4, and m is an integer of 1 to 10.

An active energy ray-curable composition defined in claim 4 is characterized in that in the invention according to any one of claims 1 to 3, the silane coupling agent is at least one kind selected from the group consisting of γ-glycidoxypropyltrimethoxysilane, γ-glycidoxypropyltriethoxysilane, epoxycyclohexylethyltrimethoxysilane, alkoxysilane represented by the following general formula (9), and 3-ethyl-3-{[3-(triethoxysilyl)propoxy]methyl}oxetane:

$$R^1-[O-Si(OR^1)_2-]_r-O-R^1 \quad (9)$$

wherein $R^1$ is a methyl group or an ethyl group, and r is an integer of 1 to 10.

An active energy ray-curable composition defined in claim 5 is characterized in that in the invention according to any one of claims 1 to 4, a silicon component in the silane coupling agent is contained in an amount of 1 to 21% by mass, in terms of silica ($SiO_2$), in the active energy ray-curable composition.

An active energy ray-curable composition defined in claim 6 is characterized in that in the invention according to any one of claims 1 to 5, the composition further contains an organic pigment or an inorganic pigment.

A cured product defined in claim 7 is characterized by being obtained by irradiating the active energy ray-curable composition defined in any one of claims 1 to 6 with an active energy ray to be cured.

An inkjet ink defined in claim 8 is characterized by being formed of the active energy ray-curable composition defined in claim 6.

A printed matter defined in claim 9 is characterized by being obtained by coating the inkjet ink defined in claim 8 on a printing surface and curing the coated inkjet ink through irradiation with an active energy ray.

According to the present invention, the following effects are exhibited.

The active energy ray-curable composition of the present invention contains, as active ingredients, an oxetane alcohol represented by the above structural formula (1) or (2), a silane coupling agent, and a photoacid-generating agent. Therefore, when the active energy ray-curable composition is irradiated with an active energy ray, such as an ultraviolet ray, a cured product is produced due to cationic polymerization.

Since the oxetane alcohol has a hydroxyl group, the hydroxyl group remains in the cured product after the cationic polymerization and contributes to improvement in adhesion to an object. Further, the obtained cationic polymer has a small free volume, so that permeation of water into the cationic polymer is suppressed. Therefore, when water acts on the cured product, the cured product is less subject to influence of the water and maintains the adhesion.

Therefore, with the active energy ray-curable composition of the present invention, effects such as an improvement in adhesiveness of a cured product and suppression of detachment or peeling of the cured product are attained.

DETAILED DESCRIPTION OF THE PREFERRED EMBODIMENTS

Hereinafter, embodiments of the present invention will be described in detail.

An active energy ray-curable composition according to the present embodiment contains an oxetane alcohol represented by the following structural formula (1) or (2), a silane coupling agent, and a photoacid-generating agent:

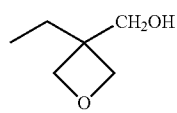

(1)

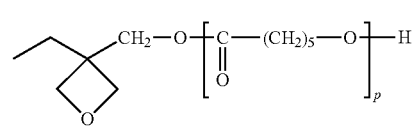

wherein p is an integer of 1 to 10.

The active energy ray-curable composition is used as, for example, an inkjet ink and is rapidly cured when irradiated with an active energy ray, such as an ultraviolet ray, to generate a cured product.

Hereinafter, the components of the active energy ray-curable composition will be described one by one.

<Oxetane Alcohol>

The oxetane alcohol is a compound represented by the above structural formula (1) or (2). The oxetane alcohol represented by the structural formula (1) is 3-ethyl-3-hydroxymethyloxetane.

The oxetane alcohol represented by the structural formula (2) is a compound having a repeating unit in the structural formula (2) between the methylene group and the hydroxyl group of the oxetane alcohol represented by the structural formula (1). In the case where p in the structural formula (2) is an integer larger than 10, the viscosity of the oxetane alcohol is increased, the cationic polymerizability thereof is deteriorated, the strength of the cured product is lowered, or the adhesiveness of the cured product is deteriorated. It is preferable that p is an integer of 1 to 5 from the viewpoint that the cured product exhibits satisfactory strength.

The content of the oxetane alcohol in the active energy ray-curable composition is preferably 10 to 90% by mass. When the oxetane alcohol content is less than 10% by mass, there may be a tendency that the adhesiveness of the cured product is deteriorated. On the other hand, when the content is larger than 90% by mass, the crosslinkability may be deteriorated due to a reduction in content of other components, such as the silane coupling agent.

<Silane Coupling Agent>

The silane coupling agent is a compound that forms a crosslinking structure in the cured product of the active energy ray-curable composition. The silane coupling agent is a compound having a hydrolysable group having affinity and reactivity with an inorganic material and an organic functional group that is chemically bonded to an organic material and is preferably a compound represented by the following general formula (3):

$$(RO)_{4-n}-Si-X_n \quad (3)$$

wherein R is a methyl group or an ethyl group, n is 0, 1, or 2, and X is an organic group having a hydrogen atom, a methyl group, an ethyl group, a vinyl group, an allyl group, a (meth)acryloyl group, a glycidyl group, a 3,4-epoxycyclohexyl group, or a (3-ethyloxetanyl)methyl group.

X in the general formula (3) is an organic group represented by the following general formulas (4), (5), (6), or (7):

$$-Y-Z-V \quad (4)$$

$$-Z-V \quad (5)$$

$$-Y-V \quad (6)$$

$$-V \quad (7)$$

wherein Y is an alkylene group having a carbon number of 1 to 3, Z is an oxygen atom or a divalent organic group having organopolysiloxane represented by general formula (8), and V is a hydrogen atom, a methyl group, an ethyl group, a vinyl group, an allyl group, a (meth)acryloyl group, a glycidyl group, a 3,4-epoxycyclohexyl group, or a (3-ethyloxetanyl)methyl group:

$$-O-[Si(Q)_2-O-]_m- \qquad (8)$$

wherein each Q is independently an alkoxy group having a carbon number of 1 to 4 or an alkyl group having a carbon number of 1 to 4, and m is an integer of 1 to 10.

More specifically, the silane coupling agent may be at least one kind selected from the group consisting of γ-glycidoxypropyltrimethoxysilane, γ-glycidoxypropyltriethoxysilane, epoxycyclohexylethyltrimethoxysilane, alkoxysilane represented by the following general formula (9), and 3-ethyl-3-{[3-(triethoxysilyl)propoxy]methyl}oxetane:

$$R^1-[O-Si(OR^1)_2-]_r-O-R^1 \qquad (9)$$

wherein $R^1$ is a methyl group or an ethyl group, and r is an integer of 1 to 10.

As to the content of the silane coupling agent, it is preferable that a silicon component in the silane coupling agent is contained in an amount of 1 to 21% by mass, in terms of silica ($SiO_2$), in the active energy ray-curable composition. When the silicon component as silica is less than 1% by mass, the crosslinkability of the active energy ray-curable composition may be deteriorated to make it difficult to attain a satisfactory crosslinking density. On the other hand, in the case where the content is larger than 21% by mass, an adverse effect such as curling of a resin film may occur when the active energy ray-curable composition is coated on the resin film.

<Photoacid-Generating Agent>

The photoacid-generating agent (photocationic polymerization initiator) is a compound capable of generating a substance that initiates cationic polymerization upon irradiation with an active energy ray. The photoacid-generating agent is incorporated into the active energy ray-curable composition in accordance with an ordinary method and is incorporated within the range of about 0.1 to 10% by mass in the active energy ray-curable composition.

As the photoacid-generating agent, a salt, a sulfonation product, a halogenation product, or an iron-allene complex of an aromatic onium compound may be used, and a salt of an aromatic onium compound is preferred from the viewpoint of capability of initiating cationic polymerization. Examples of the aromatic onium salt include $B(C_6F_5)_4^-$, $PF_6^-$, $AsF_6^-$, $SbF_6^-$, and $CF_3SO_3^-$ salts of an aromatic onium compound, such as diazonium, ammonium, iodonium, sulfonium, and phosphonium. The following compounds are usable as the aromatic onium compound.

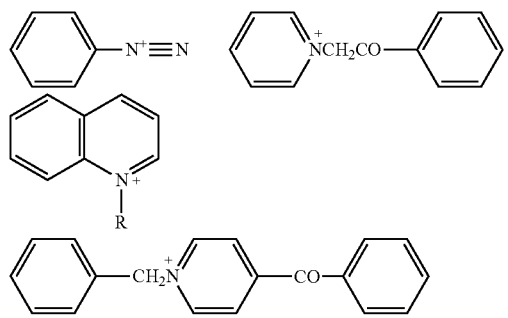

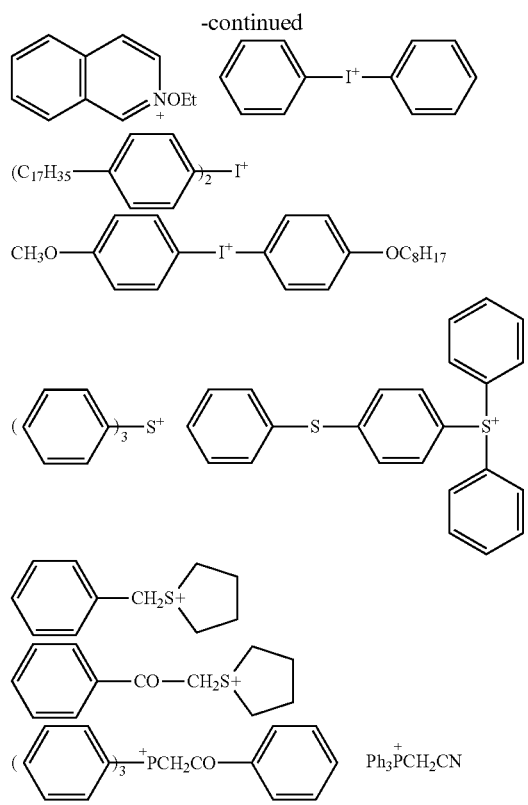

<Other Components>
(Cationically Polymerizable Compound)

As other components, a cationically polymerizable compound may be incorporated when so required. Examples of the cationically polymerizable compound include an epoxy compound, a vinyl ether compound, and an oxetane compound.

Examples of the epoxy compound include an aromatic epoxide, an alicyclic epoxide, and an aliphatic epoxide. As the aromatic epoxide, a di- or poly-glycidyl ether obtainable by a reaction of a polyvalent phenol having at least one aromatic ring or an alkylene oxide adduct thereof with epichlorohydrin. Examples thereof include a di- or poly-glycidyl ether of bisphenol A or an alkylene oxide adduct thereof, a di- or poly-glycidyl ether of hydrogenated bisphenol A or an alkylene oxide adduct thereof, and a novolac epoxy resin. Examples of the alkylene oxide include ethylene oxide and propylene oxide.

As the alicyclic epoxide, a cyclohexene oxide- or cyclopentene oxide-containing compound obtainable by epoxidizing a compound having at least one cycloalkane ring, such as a cyclohexene ring and a cyclopentene ring, with an oxidizing agent, such as hydrogen peroxide and peroxide, may be used.

As the aliphatic epoxide, a di- or poly-glycidyl ether of an aliphatic polyvalent alcohol or an alkylene oxide adduct thereof may be used. Examples thereof include a diglycidyl ether of an alkylene glycol, such as a diglycidyl ether of ethylene glycol, a diglycidyl ether of polypropylene glycol, and a diglycidyl ether of 1,6-hexanediol; a polyglycidyl ether of a polyvalent alcohol, such as a di- or tri-glycidyl ether of glycerin or an alkylene oxide adduct thereof; and a diglycidyl ether of polyalkylene glycol, such as a diglycidyl ether of polyethylene glycol or an alkylene oxide adduct thereof and a diglycidyl ether of polypropylene glycol or an alkylene oxide adduct thereof. Examples of the alkylene oxide include ethylene oxide and propylene oxide.

Among the above epoxides, an aromatic epoxide or an alicyclic epoxide is preferred, and an alicyclic epoxide is further preferred, from the viewpoint of curability. Also, one, two, or more epoxide(s) to be used may appropriately be selected from these epoxides.

As the vinyl ether compound, a di- or tri-vinyl ether compound, such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, and trimethylolpropane trivinyl ether, and a monovinyl ether compound, such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexane dimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether.

Among the above vinyl ether compounds, a di- or tri-vinyl ether compound is preferred, and a divinyl ether compound is more preferred, from the viewpoint of curability and adhesiveness. Also, one, two, or more vinyl ether compound(s) to be used may appropriately be selected from these vinyl ether compounds.

The oxetane compound is a compound having an oxetane ring and different from the oxetane alcohol represented by the structural formula (1) or (2). A preferable oxetane compound is an oxetane compound in which the number of oxetane rings is 1 to 4.

Specific examples of the oxetane compound include 3-ethyl-3-{[(3-ethyloxetan-3-yl)methoxy]methyl}oxetane, 3-ethyl-3-hydroxymethyloxetane, 4,4'-bis[(3-ethyl-3-oxetanyl)methoxymethyl]biphenyl, 3-(meth)allyloxymethyl-3-ethyloxetane, (3-ethyl-3-oxetanylmethoxy)methylbenzene, (3-ethyl-3-oxetanylmethoxy)benzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl(3-ethyl-3-oxetanylmethyl)ether, isobornyloxyethyl-(3-ethyl-3-oxetanylmethyl)ether, isobornyl(3-ethyl-3-oxetanylmethyl)ether, 2-ethylhexyl(3-ethyl-3-oxetanylmethyl)ether, ethyldiethyleneglycol(3-ethyl-3-oxetanylmethyl)ether, dicyclopentadiene-(3-ethyl-3-oxetanylmethyl)ether, dicyclopentenyloxyethyl(3-ethyl-3-oxetanylmethyl)ether, dicyclopentyl(3-ethyl-3-oxetanylmethyl)ether, tetrahydrofurfuryl-(3-ethyl-3-oxetanylmethyl)ether, tetrabromophenyl(3-ethyl-3-oxetanylmethyl)ether, 2-tetrabromophenoxyethyl-(3-ethyl-3-oxetanylmethyl)ether, tribromophenyl(3-ethyl-3-oxetanylmethyl)ether, 2-tribromophenoxyethyl-(3-ethyl-3-oxetanylmethyl)ether, butoxyethyl(3-ethyl-3-oxetanylmethyl)ether, pentachlorophenyl-(3-ethyl-3-oxetanylmethyl)ether, pentabromophenyl(3-ethyl-3-oxetanylmethyl)ether, bornyl-(3-ethyl-3-oxetanylmethyl)ether, 3,7-bis(3-oxetanyl)-5-oxanonane, 3,3'-[1,3-(2-methylenyl)-propanediylbis(oxymethylene)]-bis(3-ethyloxetane), 1,4-bis[(3-ethyl-3-oxetanylmethoxy)methyl]]benzene, 1,2-bis[(3-ethyl-3-oxetanylmethoxy)methyl]ethane, 1,3-bis[(3-ethyl-3-oxetanylmethoxy)methyl]propane, ethyleneglycolbis(3-ethyl-3-oxetanylmethyl)ether, dicyclopentenylbis(3-ethyl-3-oxetanylmethyl)ether, triethyleneglycolbis(3-ethyl-3-oxetanylmethyl)ether, tetraethyleneglycolbis(3-ethyl-3-oxetanylmethyl)ether, tricyclodecanediyldimethylene-(3-ethyl-3-oxetanylmethyl)ether, trimethylolpropanetris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritoltris(3-ethyl-3-oxetanylmethyl)ether, pentaerythritoltetrakis(3-ethyl-3-oxetanylmethyl)ether, polyethyleneglycolbis(3-ethyl-3-oxetanylmethyl)ether, dipentaerythritolhexakis-(3-ethyl-3-oxetanylmethyl)ether, dipentaerythritolpentakis-(3-ethyl-3-oxetanylmethyl)ether, dipentaerythritoltetrakis-(3-ethyl-3-oxetanylmethyl)ether, caprolactone-modified dipentaerythritolhexakis(3-ethyl-3-oxetanylmethyl)ether, caprolactone-modified dipentaerythritolpentakis(3-ethyl-3-oxetanylmethyl)ether, ditrimethylolpropanetetrakis(3-ethyl-3-oxetanylmethyl)ether, ethylene oxide-modified bisphenol A-bis(3-ethyl-3-oxetanylmethyl)ether, propylene oxide-modified bisphenol A-bis(3-ethyl-3-oxetanylmethyl)ether, ethylene oxide-modified hydrogenated bisphenol A-bis(3-ethyl-3-oxetanylmethyl)ether, propylene oxide-modified hydrogenated bisphenol A-bis(3-ethyl-3-oxetanylmethyl)ether, and ethylene oxide-modified bisphenol F-(3-ethyl-3-oxetanylmethyl)ether.

(Pigment)

A pigment may be incorporated into the active energy ray-curable composition in order to impart a desired color to the active energy ray-curable composition according to an ordinary method. As the pigment, a known organic pigment or inorganic pigment may be used. Examples of the organic pigment include a soluble azo pigment, such as lake red C and permanent red 2B; an insoluble azo pigment, such as first yellow and naphthol red; a condensed azo pigment, such as cromophtal yellow and cromophtal red; a phthalocyanine pigment, such as phthalocyanine blue and phthalocyanine green; and a condensed polycyclic pigment, such as thioindigo and perylene red; and the like.

Examples of the inorganic pigment include an oxide pigment, such as cobalt blue, zinc white, and light red; a hydroxide pigment, such as viridian and alumina white; a sulfide pigment, such as cadmium yellow and cadmium red; a silicate pigment, such as ultramarine, talc, and white carbon; and a carbonate pigment, such as silver white and calcium carbonate.

In order to disperse the pigment into the active energy ray-curable composition, a dispersing agent, such as a higher fatty acid salt, an alkyl sulfate salt, and an alkyl sulfonate salt may be used.

The active energy ray-curable composition having the above-described constitution is usable as an ink, such as an inkjet ink. In the case of the usage as an ink, the composition has a viscosity of preferably 5 to 30 mPa·s, for example, in order to attain a good injection property when injected from an inkjet head and a good printing property as a result of suppression of permeation into a recording paper. A printed matter is obtained by coating the ink on a surface of a printing object and then curing the coated ink through irradiation with an active energy ray.

Also, the active energy ray-curable composition is usable as an ultraviolet ray-curable coating having good adhesiveness.

Hereinafter, a method of curing the active energy ray-curable composition will be described.

It is possible to cure the active energy ray-curable composition by irradiation with an active energy ray under predetermined conditions. For example, it is possible to form a coating film (cured product) by coating the active energy ray-curable composition on a surface of an object such as a glass and then curing the active energy ray-curable composition by irradiation with an active energy ray. As the active energy ray, an ultraviolet ray or an electron beam may be used, and the active energy ray is irradiated within the range of predetermined irradiation amounts (light quantity).

In the case where an ultraviolet ray is used as the active energy ray, a mercury lamp or a metal halide lamp is preferably used, and a cumulative light quantity of the ultraviolet ray irradiation is desirably 100 to 10,000 mJ/cm$^2$. In the case where an electron beam is used as the active energy ray, an irradiation amount thereof is preferably 1 to 20 Mrad at an accelerated voltage of 150 to 250 keV.

Hereinafter, actions of the active energy ray-curable composition will be described.

When the active energy ray-curable composition is irradiated with an active energy ray, energy of the active energy ray is absorbed by the photoacid-generating agent to generate positive ions (cations). The oxygen atoms forming the oxetane ring of the oxetane alcohol have a polarity and are negatively charged. The positive ions generated by the photoacid-generating agent approach to the negatively charged oxygen atoms of the oxetane ring, and cationic polymerization is initiated when the oxygen atoms become oxonium ions. The oxonium ions attack on other negatively charged oxygen atoms to open the oxetane ring, and thus the cationic polymerization proceeds. A crosslinking reaction of the alkoxy group (OR) and the organic group (X) of the silane coupling agent with the cationic polymer generated by the cationic polymerization reaction is caused to form a cured product having a three-dimensional crosslinking structure.

Therefore, in the coating film (cured product) obtained by coating the active energy ray-curable composition on an object and then performing irradiation with an active energy ray, the hydroxyl group of the oxetane alcohol remains as it is, and the hydroxyl group enhances adhesion of the coating film to the object. What is more, since the cationic polymer forming the coating film has a small free volume, water is prevented from entering the coating film. As a result, even when the coating film is exposed to water, the adhesion of the coating film to the object is maintained.

Effects exhibited by the above-described embodiments are described below.

(1) The active energy ray-curable composition of the present embodiment contains, as the active ingredients, the oxetane alcohol, the silane coupling agent, and the photoacid-generating agent. Therefore, when the active energy ray-curable composition is irradiated with an active energy ray, a cured product is produced due to cationic polymerization.

The hydroxyl group of the oxetane alcohol remains in the cured product after the cationic polymerization and contributes to the improvement in adhesion to an object. Further, since the obtained cationic polymer has a small free volume, water is prevented from entering it. Therefore, when water acts on the cured product, the cured product is less subject to influence of the water and maintains the adhesion.

Thus, according to the active energy ray-curable composition of the present embodiment, the effects that the adhesiveness of the cured product is improved and that detachment or peeling of the cured product is suppressed are attained.

(2) The silane coupling agent is a compound represented by the above general formula (3). Therefore, the crosslinking reaction based on the silane coupling agent smoothly proceeds. Further, X in the general formula (3) is an organic group represented by the general formulas (4), (5), (6), or (7). More specifically, the silane coupling agent is at least one kind selected from γ-glycidoxypropyltrimethoxysilane, γ-glycidoxypropyltriethoxysilane, epoxycyclohexylethyltrimethoxysilane, alkoxysilane represented by the above general formula (9), and 3-ethyl-3-{[3-(triethoxysilyl)propoxy]methyl}oxetane. With the use of such a silane coupling agent, the crosslinking reaction by the silane coupling agent is further promoted.

(3) The silicon component in the silane coupling agent is contained in the amount of 1 to 21% by mass, in terms of silica ($SiO_2$), in the active energy ray-curable composition. Therefore, when the active energy ray-curable composition is coated on a thin resin film, the resin film is free from curling, and a coating film having a satisfactory thickness is formed.

(4) The active energy ray-curable composition contains an organic pigment or an inorganic pigment. Therefore, it is possible to readily impart a desired color to the cured product of the active energy ray-curable composition.

(5) The cured product is obtained by irradiating the active energy ray-curable composition with an active energy ray. Since the cured product is obtainable by the irradiation with an active energy ray, it is possible to obtain the cured product thus simply and quickly.

(6) The inkjet ink is formed of the active energy ray-curable composition containing an organic pigment or an inorganic pigment. Therefore, it is possible to impart a desired color to a printed matter obtained by using the inkjet ink.

(7) The printed matter is obtained by coating the inkjet ink on a surface of a printing object and then curing the coated inkjet ink through irradiation with an active energy ray.

Thus, the printed matter is obtained easily and quickly by the coating of the inkjet ink and the irradiation with an active energy ray.

EXAMPLES

Hereinafter, the embodiments will be described in more details with examples and comparative examples.

An oxetane alcohol, a silane coupling agent, and a photoacid-generating agent used in each of the examples and comparative examples are described below together with abbreviations.

(Oxetane Alcohol)
OXA: 3-ethyl-3-hydroxymethyloxetane [the compound of the above structural formula (1)]
(Silane Coupling Agent)
GLYMO: γ-glycidoxypropyltrimethoxysilane

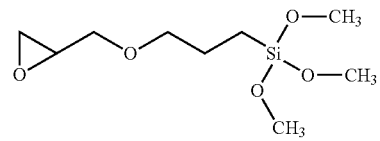

KBM303: epoxycyclohexylethyltrimethoxysilane

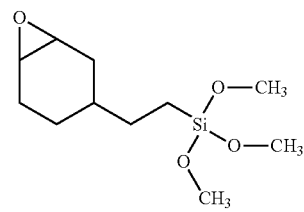 [SMILES: CO[Si](CCC1CCC2OC2C1)(OC)OC]

MS-51: silane coupling agent of the above general formula (3), wherein n=1, X is an organic group represented by the general formula (5), and Z is the general formula (8) in which Q is a methoxy group and m is 4 (Methyl Silicate 51 manufactured by Colcoat Co., Ltd).

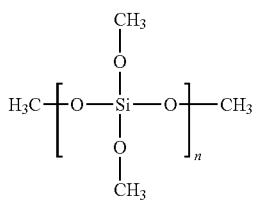

(Photoacid-Generating Agent)

PAG: diphenyl(4-phenylthio)phenylsulfonium·hexafluorophosphate (CPI-100P manufactured by San-Apro Ltd.)

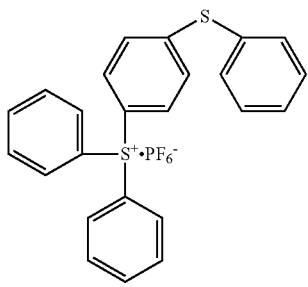

(Other Components)

DOX: 3-ethyl-3-{[(3-ethyloxetan-3-yl)methoxy]methyl}oxetane (Aron Oxetane OXT-221 manufactured by Toagosei Co., Ltd.)

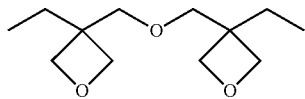

2021P: 3,4-epoxycyclohexylmethyl-3,4-epoxycyclohexanecarboxylate (Celloxide 2021P manufactured by Daicel Corporation)

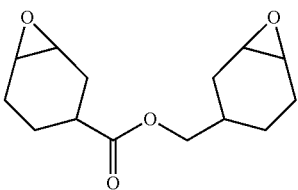 [SMILES: O=C(OCC1CCC2OC2C1)C1CCC2OC2C1]

Inorganic pigment: pigment red 101 (CAS: 1309-37-1)
Organic pigment: pigment red 122 (CAS: 980-26-7)

Examples 1 to 11 and Comparative Examples 1 to 6

The above-described materials are incorporated at contents shown in Table 1 to prepare active energy ray-curable compositions. The contents shown in Table 1 are in terms of part(s) by mass.

Each of the obtained active energy ray-curable compositions was coated on a glass plate, and the coated active energy ray-curable composition was irradiated with an ultraviolet ray having illuminance of 150 mW by using a high pressure mercury lamp to be cured.

The curability, adhesiveness to glass, and adhesiveness after hot water immersion of the active energy ray-curable compositions were measured by the following methods. The results are shown in Table 1.

(Curability)

○○: No tuck was observed on a surface of the cured product obtained by curing with an ultraviolet ray of a cumulative light quantity of 250 mJ.

○: No tuck was observed on a surface of the cured product obtained by curing with an ultraviolet ray of a cumulative light quantity of 500 mJ.

x: Remained in a liquid form when cured with an ultraviolet ray of a cumulative light quantity of 750 mJ.

(Adhesiveness)

The measurement was performed in accordance with JIS K5400. That is, a grid pattern having twenty-five 2-mm squares was formed on the cured product, and then a peeling test was conducted to determine adhesiveness.

○: All of 25 squares were in close contact.

x: One or more squares were not in close contact.

(Adhesiveness after Hot Water Immersion)

The cured product was immersed into hot water of 70° C. for 5 minutes and then wiped lightly, and adhesiveness was measured in the same manner as above.

○○: All of 25 squares were in close contact.

○: All of 25 squares were in close contact though there was a slight change.

x: One or more squares were not in close contact.

TABLE 1

| | | Examples | | | | | | | | | | | Comparative Examples | | | | | |
| --- | --- | --- | --- | --- | --- | --- | --- | --- | --- | --- | --- | --- | --- | --- | --- | --- | --- | --- |
| | | 1 | 2 | 3 | 4 | 5 | 6 | 7 | 8 | 9 | 10 | 11 | 1 | 2 | 3 | 4 | 5 | 6 |
| Oxetane alcohol | OXA | 16 | 36 | 56 | 76 | 86 | 56 | 56 | 35 | 35 | 53 | 53 | 96 | — | 60 | 60 | — | — |
| Silane coupling agent | GLYMO | 80 | 60 | 40 | 20 | 10 | — | — | 26 | 26 | 38 | 38 | — | 96 | — | — | 40 | 40 |
| | KBM-303 | — | — | — | — | — | 40 | — | — | — | — | — | — | — | — | — | — | — |
| | MS-51 | — | — | — | — | — | — | 40 | — | — | — | — | — | — | — | — | — | — |
| Photoacid-generating agent | PAG | 4 | 4 | 4 | 4 | 4 | 4 | 4 | 4 | 4 | 4 | 4 | 4 | 4 | 4 | 4 | 4 | 4 |

TABLE 1-continued

|  |  | Examples |  |  |  |  |  |  |  |  |  |  | Comparative Examples |  |  |  |  |  |
|---|---|---|---|---|---|---|---|---|---|---|---|---|---|---|---|---|---|---|
|  |  | 1 | 2 | 3 | 4 | 5 | 6 | 7 | 8 | 9 | 10 | 11 | 1 | 2 | 3 | 4 | 5 | 6 |
| Other components | DOX | — | — | — | — | — | — | — | 35 | — | — | — | — | — | 36 | — | 56 | — |
|  | 2021P | — | — | — | — | — | — | — | — | 35 | — | — | — | — | — | 36 | — | 56 |
|  | Inorganic pigment | — | — | — | — | — | — | — | — | — | 5 | — | — | — | — | — | — | — |
|  | Organic pigment | — | — | — | — | — | — | — | — | — | — | 5 | — | — | — | — | — | — |
| Silicon component (% by mass) |  | 20.3 | 15.3 | 10.2 | 5.1 | 2.5 | 9.7 | 20.4 | 6.6 | 6.6 | 9.7 | 9.7 | 0.0 | 24.4 | 0.0 | 0.0 | 10.2 | 10.2 |
| Curability |  | ○ | ○ | ○○ | ○ | ○ | ○○ | ○ | ○ | ○ | ○ | ○ | ○ | x | x | ○ | ○ | ○ |
| Adhesiveness |  | ○ | ○ | ○ | ○ | ○ | ○ | ○ | ○ | ○ | ○ | ○ | x | — | — | ○ | x | ○ |
| Adhesiveness after hot water immersion |  | ○○ | ○○ | ○○ | ○ | ○ | ○○ | ○ | ○ | ○○ | ○○ | ○○ | x | — | — | x | x | x |

The results shown in Table 1 reveal that, since each of Examples 1 to 11 contains the specific oxetane alcohol, silane coupling agent, and photoacid-generating agent described above, curability in irradiation with an ultraviolet ray is good, and adhesiveness and adhesiveness after hot water immersion are favorable. In contrast, in Comparative Examples 1 to 6, which do not contain the oxetane alcohol or the silane coupling agent, curability was deteriorated, or adhesiveness or adhesiveness after hot water immersion was poor even when curability was good.

The curable composition of Comparative Example 5 contains an oxetane compound (DOX), a silane coupling agent, and a photoacid-generating agent (conventional composition of the invention described in Japanese Laid-Open Patent Publication No. 2011-153255), and adhesiveness and adhesiveness after hot water immersion were poor. It is assumed that the oxetane compound (DOX) lacks the functional group that improves the adhesiveness since it is an ether compound, not an oxetane alcohol having a hydroxyl group, and that water readily enters the cationic polymer since a free volume of the polymer is large.

Examples 12 to 14

In each of Examples 12 to 14, the active energy ray-curable composition of Examples 1, 3, or 6 was used as an inkjet ink. An injection property, a droplet shape, curability, and adhesiveness of each of the inkjet inks were measured by the following methods. The results are shown in Table 2.

(Injection Property)
The inkjet ink was injected from an inkjet head (UH-80) manufactured by IJT, and the injection property was evaluated based on the following criteria.
○: The inkjet ink stably flied.
x: The inkjet ink was not injected from the inkjet head or the injection was unstable.

(Droplet Shape)
The shape of a droplet of the inkjet ink was evaluated by visual observation based on the following criteria.
○: The droplet had a spherical shape and was good.
x: The droplet had an amorphous shape and was poor.

(Curability)
The curability was measured by irradiating with an ultraviolet ray having illuminance of 150 mW.
○○: No tuck was observed on a surface of the cured product obtained by curing with an ultraviolet ray of a cumulative light quantity of 250 mJ.
○: No tuck was observed on a surface of the cured product obtained by curing with an ultraviolet ray of a cumulative light quantity of 500 mJ.
x: Remained in a liquid form when cured with an ultraviolet ray of a cumulative light quantity of 750 mJ.

(Adhesiveness)
After forming 25 dots by injecting the inkjet ink by using the inkjet head, the dots were cured by the irradiation with an ultraviolet ray, and then adhesiveness was measured. An adhesive tape was adhered to each of the dots and then was peeled off to measure whether or not the dot was detached.
○: All of 25 dots remained adhered.
x: One or more dots were detached.

TABLE 2

|  |  | Examples |  |  |
|---|---|---|---|---|
|  |  | 12 | 13 | 14 |
| Oxetane alcohol | OXA | 16 | 56 | 56 |
| Silane coupling agent | GLYMO | 80 | 40 | — |
|  | KBM-303 | — | — | 40 |
| Photoacid-generating agent | PAG | 4 | 4 | 4 |
| Silicon component (% by mass) |  | 20.3 | 10.2 | 9.7 |
| Injection property |  | ○ | ○ | ○ |
| Droplet shape |  | ○ | ○ | ○ |
| Curability |  | ○ | ○○ | ○○ |
| Adhesiveness |  | ○ | ○ | ○ |

As shown in Table 2, each of Examples 12 to 14 attained the results that the injection property, droplet shape, curability, and adhesiveness are good.

Example 15

An oxetane alcohol (OXA-1) [oxetane alcohol of which P=1 in the above structural formula (2)] having the following structure was prepared in the following manner. More specifically, a 200-ml flask provided with a condenser was charged with 29.5 g (0.258 mol) of ε-caprolactone (manufactured by Wako Pure Chemical Industries, Ltd.; purity: 99% by mass), 30.0 g (0.258 mol) of 3-ethyl-3-hydroxymethyloxetane (Aron Oxetane OXT-101, manufactured by Toagosei Co., Ltd.), and 0.06 g of a butyltin-based compound (monobutyltin) (SCAT-24, manufactured by NITTO KASEI Co., Ltd.), and a reaction was allowed at 110° C. for 7 hours with stirring, thereby obtaining the oxetane alcohol (OXA-1) having the following structure. The structure of the oxetane alcohol was confirmed by using an infrared absorption spectrum analysis device (FT/IR-410, manufactured by JASCO Corporation).

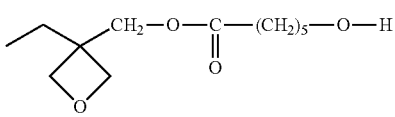

An active energy ray-curable composition having contents shown in Table 3 was obtained by using the above-obtained oxetane alcohol. The curability, adhesiveness, and adhesiveness after hot water immersion of the thus-obtained active energy ray-curable composition were measured in the same manner as in Example 1, and the results are shown in Table 3.

TABLE 3

|  |  | Example | |
|---|---|---|---|
|  |  | 15 | 16 |
| Oxetane alcohol | OXA-1 | 56 | — |
|  | OXA-2 | — | 56 |
| Silane coupling agent | GLYMO | 40 | 40 |
|  | KBM-303 | — | — |
| Photoacid-generating agent | PAG | 4 | 4 |
| Silicon component (% by mass) |  | 10.2 | 10.2 |
| Curability |  | ∘∘ | ∘∘ |
| Adhesiveness |  | ∘ | ∘ |
| Adhesiveness after hot water immersion |  | ∘∘ | ∘∘ |

The results shown in Table 3 reveal that the active energy ray-curable composition of Example 15 has a good curability, adhesiveness, and adhesiveness after hot water immersion.

Example 16

An oxetane alcohol (OXA-2) [oxetane alcohol of which P=5 in the above structural formula (2)] having the following structure was prepared in the following manner. More specifically, a 200-ml flask provided with a condenser was charged with 49.1 g (0.430 mol) of ε-caprolactone (manufactured by Wako Pure Chemical Industries, Ltd.: purity: 99% by mass), 10.0 g (0.086 mol) of 3-ethyl-3-hydroxymethyloxetane (Aron Oxetane OXT-101, manufactured by Toagosei Co., Ltd.), and 0.06 g of a butyltin-based compound (monobutyltin) (SCAT-24, manufactured by NITTO KASEI Co., Ltd.), and a reaction was allowed at 110° C. for 7 hours with stirring, thereby obtaining the oxetane alcohol (OXA-2) having the following structure. The structure of the oxetane alcohol was confirmed by using an infrared absorption spectrum analysis device (FT/IR-410, manufactured by JASCO Corporation).

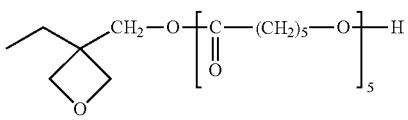

An active energy ray-curable composition having contents shown in Table 3 was obtained by using the above-obtained oxetane alcohol. The curability, adhesiveness, and adhesiveness after hot water immersion of the thus-obtained active energy ray-curable composition were measured in the same manner as in Example 1, and the results are shown in Table 3.

The results shown in Table 3 reveal that the active energy ray-curable composition of Example 16 has a good curability, adhesiveness, and adhesiveness after hot water immersion.

The present embodiment may be carried out with the following modifications.

At least one of the oxetane alcohol, the silane coupling agent, and the photoacid-generating agent of the active energy ray-curable composition may be formed by a plurality of compounds. Also, a plurality of compounds may be incorporated as one of the other components incorporated into the active energy ray-curable composition.

An adhesiveness-imparting agent such as polysiloxane may be incorporated into the active energy ray-curable composition in order to further enhance the adhesiveness.

A photostabilizer, an antioxidant, or an antistatic agent may be incorporated into the active energy ray-curable composition as required.

The invention claimed is:

1. An inkjet ink comprising an active energy ray-curable composition containing an oxetane alcohol represented by structural formula (1) or (2), a silane coupling agent, a photoacid-generating agent, and an organic or inorganic pigment:

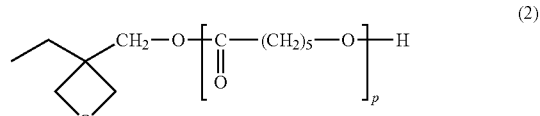

wherein p is an integer of 1 to 10.

2. The inkjet ink according to claim 1, wherein the silane coupling agent is a compound represented by general formula (3):

$$(RO)_{4-n}—Si—X_n \quad (3)$$

wherein R is a methyl group or an ethyl group, n is 0, 1, or 2, and X is an organic group having a hydrogen atom, a methyl group, an ethyl group, a vinyl group, an allyl group, a (meth)acryloyl group, a glycidyl group, a 3,4-epoxycyclohexyl group, or a (3-ethyloxetanyl) methyl group.

3. The inkjet ink according to claim 2, wherein X in the general formula (3) is an organic group represented by general formulas (4), (5), (6), or (7):

$$—Y—Z—V \quad (4)$$

$$—Z—V \quad (5)$$

$$—Y—V \quad (6)$$

$$—V \quad (7)$$

wherein Y is an alkylene group having a carbon number of 1 to 3, Z is an oxygen atom or a divalent organic group having organopolysiloxane represented by general formula (8), and V is a hydrogen atom, a methyl group, an ethyl group, a vinyl group, an allyl group, a (meth)acryloyl group, a glycidyl group, a 3,4-epoxycyclohexyl group, or a (3-ethyloxetanyl)methyl group:

—O—[Si(Q)$_2$-O—]$_m$— (8)

wherein each Q is independently an alkoxy group having a carbon number of 1 to 4 or an alkyl group having a carbon number of 1 to 4, and m is an integer of 1 to 10.

4. The inkjet ink according to claim 1, wherein the silane coupling agent is at least one kind selected from the group consisting of γ-glycidoxypropyltrimethoxysilane, γ-glycidoxypropyltriethoxysilane, epoxycyclohexylethyltrimethoxysilane, alkoxysilane represented by general formula (9), and 3-ethyl-3-{[3-(triethoxysilyl)propoxy]methyl}oxetane:

R$^1$[O—Si(OR$^1$)$_2$—]$_r$—O—R$^1$ (9)

wherein R$^1$ is a methyl group or an ethyl group, and r is an integer of 1 to 10.

5. The inkjet ink according to claim 1, wherein a silicon component in the silane coupling agent is contained in an amount of 1 to 21% by mass, in terms of silica (SiO$_2$), in the active energy ray-curable composition.

6. A cured product obtained by irradiating the inkjet ink according to claim 1 with an active energy ray to be cured.

7. A printed matter obtained by coating the inkjet ink according to claim 1 on a printing surface and curing the coated inkjet ink through irradiation with an active energy ray.

8. The inkjet ink according to claim 2, wherein a silicon component in the silane coupling agent is contained in an amount of 1 to 21% by mass, in terms of silica (SiO$_2$), in the active energy ray-curable composition.

9. The inkjet ink according to claim 3, wherein a silicon component in the silane coupling agent is contained in an amount of 1 to 21% by mass, in terms of silica (SiO$_2$), in the active energy ray-curable composition.

10. The inkjet ink according to claim 4, wherein a silicon component in the silane coupling agent is contained in an amount of 1 to 21% by mass, in terms of silica (SiO$_2$), in the active energy ray-curable composition.

11. The inkjet ink according to claim 1, wherein the active energy ray-curable composition has a viscosity of from about 5 mPa·s to about 30 mPa·s.

* * * * *

UNITED STATES PATENT AND TRADEMARK OFFICE
CERTIFICATE OF CORRECTION

PATENT NO.        : 9,447,294 B2                                              Page 1 of 1
APPLICATION NO.   : 14/380777
DATED             : September 20, 2016
INVENTOR(S)       : Nakagawa et al.

It is certified that error appears in the above-identified patent and that said Letters Patent is hereby corrected as shown below:

In the Claims

Column 17, Line 16, replace "$R^1$[" with "$R^1$-["

Signed and Sealed this
Second Day of May, 2017

Michelle K. Lee
*Director of the United States Patent and Trademark Office*